(12) United States Patent
Miller et al.

(10) Patent No.: US 8,313,716 B2
(45) Date of Patent: Nov. 20, 2012

(54) SPINNING FLUIDS REACTOR

(75) Inventors: Jan D. Miller, Salt Lake City, UT (US);
Jan Hupka, Gdansk (PL); Robert Aranowski, Starograd Gdanski (PL)

(73) Assignee: University Of Utah Research Foundation, Salt Lake City, UT (US)

( * ) Notice: Subject to any disclaimer, the term of this patent is extended or adjusted under 35 U.S.C. 154(b) by 71 days.

(21) Appl. No.: 13/056,720

(22) PCT Filed: Jul. 31, 2009

(86) PCT No.: PCT/US2009/052432
§ 371 (c)(1),
(2), (4) Date: May 2, 2011

(87) PCT Pub. No.: WO2010/014918
PCT Pub. Date: Feb. 4, 2010

(65) Prior Publication Data
US 2011/0223091 A1      Sep. 15, 2011

Related U.S. Application Data

(60) Provisional application No. 61/085,183, filed on Jul. 31, 2008.

(51) Int. Cl.
*B01D 53/00* (2006.01)
*B01D 53/14* (2006.01)
*B01J 19/00* (2006.01)
*B01J 19/12* (2006.01)
*C01C 3/02* (2006.01)
*C02F 1/72* (2006.01)
*D21C 11/00* (2006.01)

(52) U.S. Cl. .......... 423/210; 423/372; 162/29; 208/390; 210/758; 422/122; 422/129; 422/186.3; 95/210

(58) Field of Classification Search .......... 423/210, 423/372; 162/29; 208/390; 210/758; 422/122, 422/129, 186.3; 95/210
See application file for complete search history.

(56) References Cited

U.S. PATENT DOCUMENTS 3,351,427 A * 11/1967 Carpenter et al. .......... 423/608
(Continued)

FOREIGN PATENT DOCUMENTS
| | | |
|---|---|---|
| EP | 0473566 | 3/1992 |
| EP | 0478528 | 4/1992 |
| JP | 06/207621 | 7/1994 |
| WO | WO 99/30796 | 6/1999 |

OTHER PUBLICATIONS

Bokotko et al; Flue Gas Treatment fort SO2 Removal with Air-Sparged Hydrocyclone Technology; Environ Sci Techonol.; Feb. 15, 2005; vol. 39, No. 4, 23 pages.

(Continued)

*Primary Examiner* — Timothy Vanoy
(74) *Attorney, Agent, or Firm* — Thorpe North & Western LLP (57) ABSTRACT

A spinning fluids reactor, includes a reactor body (24) having a circular cross-section and a fluid contactor screen (26) within the reactor body (24). The fluid contactor screen (26) having a plurality of apertures and a circular cross-section concentric with the reactor body (24) for a length thus forming an inner volume (28) bound by the fluid contactor screen (26) and an outer volume (30) bound by the reactor body (24) and the fluid contactor screen (26). A primary inlet (20) can be operatively connected to the reactor body (24) and can be configured to produce flow-through first spinning flow of a first fluid within the inner volume (28). A secondary inlet (22) can similarly be operatively connected to the reactor body (24) and can be configured to produce a second flow of a second fluid within the outer volume (30) which is optionally spinning.

21 Claims, 5 Drawing Sheets

U.S. PATENT DOCUMENTS

| | | | |
|---|---|---|---|
| 3,541,003 A * | 11/1970 | Carr et al. | 208/230 |
| 4,279,743 A | 7/1981 | Miller | |
| 4,397,741 A | 8/1983 | Miller | |
| 4,399,027 A | 8/1983 | Miller | |
| 4,705,908 A | 11/1987 | Gondouin | |
| 4,744,890 A | 5/1988 | Miller et al. | |
| 4,781,047 A | 11/1988 | Bressan | |
| 4,818,295 A | 4/1989 | Converse et al. | |
| 4,838,434 A | 6/1989 | Miller et al. | |
| 4,881,476 A | 11/1989 | Becker et al. | |
| 5,171,405 A | 12/1992 | Torregrossa | |
| 5,349,836 A | 9/1994 | Lee, Jr. | |
| 5,472,567 A | 12/1995 | Torregrossa | |
| 5,529,701 A | 6/1996 | Grisham et al. | |
| 5,730,875 A | 3/1998 | Grisham et al. | |
| 6,830,608 B1 | 12/2004 | Peters | |
| 6,918,949 B1 | 7/2005 | Peters | |
| 7,429,621 B2 | 9/2008 | Miller et al. | |
| 2003/0146523 A1 | 8/2003 | Morse et al. | |

OTHER PUBLICATIONS

Hupka et al.; Air Sparged Hydrocyclone (ASH) Technology for Cyanide Recovery; SME Annual Meeting, Denver, CO; Feb. 23-25, 2004.

Hupka et al.; Air Sparged Hydrocyclone (ASH) Technology for Separation and Environmental Clean-Up; 14 pages; Excerpt from Innovations in Natural Resource Processing: Proceedings of the Jan. D. Miller Symposium; Young et al.; SME, 2005.

Hupka et al.; Recovery of CO2 From Flue Gases: Ash Performance; Mar. 2008; 1 Page; Poster.

Hupka; Potential of Ash Technology for Protection Against Chemical and Biological Attacks; IEE International Conference on Technologies for Homeland Security and Safety, TEHOSS 2005, Sep. 28-30, 2005, Gdansk, p. 503-508.

PCT Application PCT/US2009/052432; filing date Jul. 31, 2009; Jan Dean Miller; ISR mailed, Mar. 18, 2010.

Perry et al.; Perry's Chemical Engineers' Handbook, Seventh Edition; 1997; pp. 19-56 through 19-65.

* cited by examiner

SPINNING FLUIDS REACTOR

RELATED APPLICATION

This application claims priority to U.S. Provisional Application No. 61/085,183, filed Jul. 31, 2008 which is incorporated herein by reference.

GOVERNMENT INTEREST

This invention was made with government support under Grant No. DE-FC26-01NT41064 awarded by the Department of Energy. The Government has certain rights to this invention

BACKGROUND OF THE INVENTION

Figure 1A:
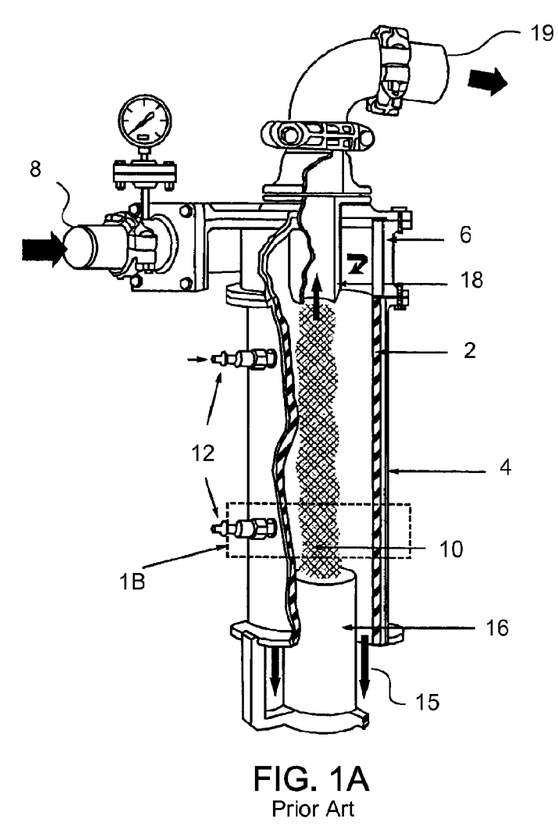
FIG. 1A is a schematic and partial cut-away view of an ASH in accordance with the prior art.

The air-sparged hydrocyclone (ASH) has been recognized as one of the basic designs for flotation equipment in the seventh edition of Perry's Chemical Engineers' Handbook and is shown in FIG. 1A. Although the ASH is included in a paragraph on Flotation Columns, it functions differently from the traditional flotation column. The ASH technology was originally developed at the University of Utah for fast flotation of fine particles from a mineral suspension. The original ASH unit consists of two concentric right-vertical tubes (a porous inner tube 2 and an outer cylinder jacket 4) and a conventional cyclone header 6 at the top. The porous inner tube is constructed of plastic, ceramic, or stainless steel and allows for the sparging of air, or other fluid. The outer non-porous tube provides an air jacket to secure even distribution of the gas phase through the porous tube.

Figure 1B:
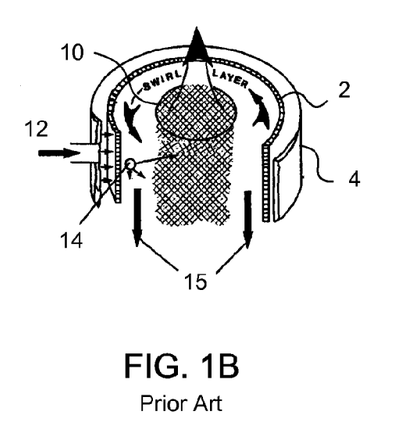
FIG. 1B is a schematic cross-sectional segment of FIG. 1A taken along lines 1B of FIG. 1A.

The aqueous phase is fed tangentially at the top through an upper inlet 8 the cyclone header 6 to develop a swirl flow adjacent to the internal surface of the porous tube, leaving an air core 10 centered on the axis of the ASH unit, as shown in FIG. 1A. A gas is injected via inlets 12 into the cylinder jacket 4 and sparging through the porous inner tube 2. The high-velocity swirl flow shears the sparged gas to produce a high concentration of small bubbles 14 as shown in the cross-section of FIG. 1B. Hydrophobic particles in the slurry, after attachment to the bubbles, are significantly reduced in their tangential velocity and transported radially into a froth phase 10, which forms along the cylindrical axis. Hydrophilic particles generally remain in the slurry phase and are discharged as an underflow product 15 through the annular opening created by the froth pedestal 16. A vortex finder 18 can be used to direct the air-froth core to an overflow outlet 19.

While the ASH has shown great promise for use in a variety of fields, the materials used, and the necessary specifications of portions of the design, in particular the porous inner tube, can be expensive. Furthermore, the ASH design is limited to sparging, or other contact requiring a gas traveling through the porous inner tube. Such a design additionally generally requires a significant and often unwanted pressure drop within the ASH.

SUMMARY OF THE INVENTION

An improved reactor, referred to as a spinning fluids reactor is presented herein. The reactor can be a continuous-process or flow-through reactor. The spinning fluids reactor can include an elongate reactor body having a circular cross-section, and a fluid contactor screen within the reactor body. The fluid contactor screen can have a plurality of apertures and a circular cross-section concentric with the reactor body for a predetermined length. The placement of the fluid contactor screen can form an inner volume bound by the fluid contactor screen and an outer volume bound by the reactor body and the fluid contactor screen. In one aspect, the ratio of the inner volume to the outer volume is about 1:1 to about 1:5, while in another aspect, the ratio can be about 1:1 to about 1:2.

The spinning fluids reactor can further include a primary inlet operatively connected to the reactor body. The primary inlet can be configured to produce a first spinning flow of a first fluid within the inner volume. A secondary inlet can also be operatively connected to the reactor body and configured to produce a second flow of a second fluid within the outer volume which is optionally spinning. The spinning fluids reactor can further include an outlet operatively connected to the reactor body and in fluid communication with the inner and the outer volumes for removal of fluids from the reactor.

Similarly, a method of reacting compounds can include forming a continuous first spinning flow with a first fluid and forming a second spinning flow with a second fluid circumscribing the first spinning flow. A barrier, such as a fluid contactor screen, between the first spinning flow and the second spinning flow can permit contact through the barrier of the second fluid to the first fluid sufficient to form a reaction product.

In one aspect, the first fluid can have a first momentum, and the second fluid can have a second momentum, where a ratio of the first momentum to the second momentum is about 0.7 to about 1.3.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

DEFINITIONS

In describing and claiming the present invention, the following terminology will be used in accordance with the definitions set forth below. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the" include plural referents unless the context clearly dictates otherwise. Thus, for example, reference to "an outlet" includes one or more of such outlets and reference to "a forming step" includes reference to one or more of such steps.

As used herein, the term "spinning flow" refers to a fluid flow path that is annular. In one aspect, the spinning flow can include vortex flow. In another aspect, the spinning flow can be a swirl flow. Furthermore, a "continuous spinning flow" indicates a flow that travels through a piece of equipment and includes an annular flow that persists for substantially the duration the flow is inside the equipment along a generally helical path.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified material, characteristic, element, or agent in a composition. Particularly, elements that are identified as being "substantially free of" are either completely absent from the composition, or are included only in amounts that are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, thicknesses, parameters, volumes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

INVENTION

A spinning fluids reactor (SFR) can be a flow-through reactor which is configured for continuous flow processing. The spinning fluids reactor can include an elongate reactor body having a circular cross-section, and a fluid contactor screen within the reactor body. The fluid contactor screen can have a plurality of apertures and a circular cross-section concentric with the reactor body for a length of at least a portion of the reactor body length. The presence of the fluid contactor screen can form an inner volume bound by the fluid contactor screen and an outer volume bound by the reactor body and the fluid contactor screen. In one aspect, the ratio of the inner volume to the outer volume is about 1:1 to about 1:5.

The spinning fluids reactor can further include a primary inlet operatively connected to the reactor body. The primary inlet can be configured to produce a first spinning flow of a first fluid within the inner volume. A secondary inlet can also be operatively connected to the reactor body and configured to produce a second flow of a second fluid within the outer volume. The second flow can be optionally spinning and may have a coincident or opposite flow spin direction from the first spinning flow. The spinning fluids reactor can further include an outlet operatively connected to the reactor body and in fluid communication with the inner and the outer volumes for removal of fluids from the reactor.

Similarly, a method of reacting compounds can include forming a continuous first spinning flow with a first fluid and forming a second flow with a second fluid circumscribing the first spinning flow. A generally cylindrical barrier, such as a fluid contactor screen, between the first spinning flow and the second spinning flow can permit contact through the barrier of the second fluid to the first fluid sufficient to form a reaction product In one aspect, the first fluid can have a first momentum, and the second fluid can have a second momentum, where a ratio of the first momentum to the second momentum is about 0.7 to about 1.3. In another aspect, the ratio of the first momentum to the second momentum can be substantially 1:1. In one aspect, the fluids can be spinning in the same direction, i.e. directionally coincident. In another aspect, the fluids can be spinning in opposite directions. The first spinning flow is generally an annular flow along an internal surface of the barrier. The annular flow can have a thickness which is at least partially a function of viscosity, fluid flow rates, cylinder diameter, and the like. However, as a general guideline, the annular flow of the first spinning flow can have an average thickness from about 10% to about 30% of a diameter of the cylindrical barrier.

The SFR contacts streams of spinning fluids to provide fast and effective mass transfer between the streams. The contacting can be used for one or more of stripping, absorption, aeration, ozonation, hydrogenation, solvent extraction, and one or more chemical reactions, or any combination thereof. The reactions and/or other processes can occur in one or both of the spinning fluid streams. Various parameters of the SFR can be altered or created to account for various processes. Non-limiting examples of variables that can potentially be altered to affect the type and efficiency of processing can include fluid stream velocity, injection angle, choice of fluids, additives to one or more fluids, selection of material for contactor screen, frequency of apertures in the contactor screen, placement of apertures in the contactor screen, thickness of contactor screen, uniformity of contactor screen, pressure or vacuum, temperature control, inner volume, and outer volume.

Figure 2A:
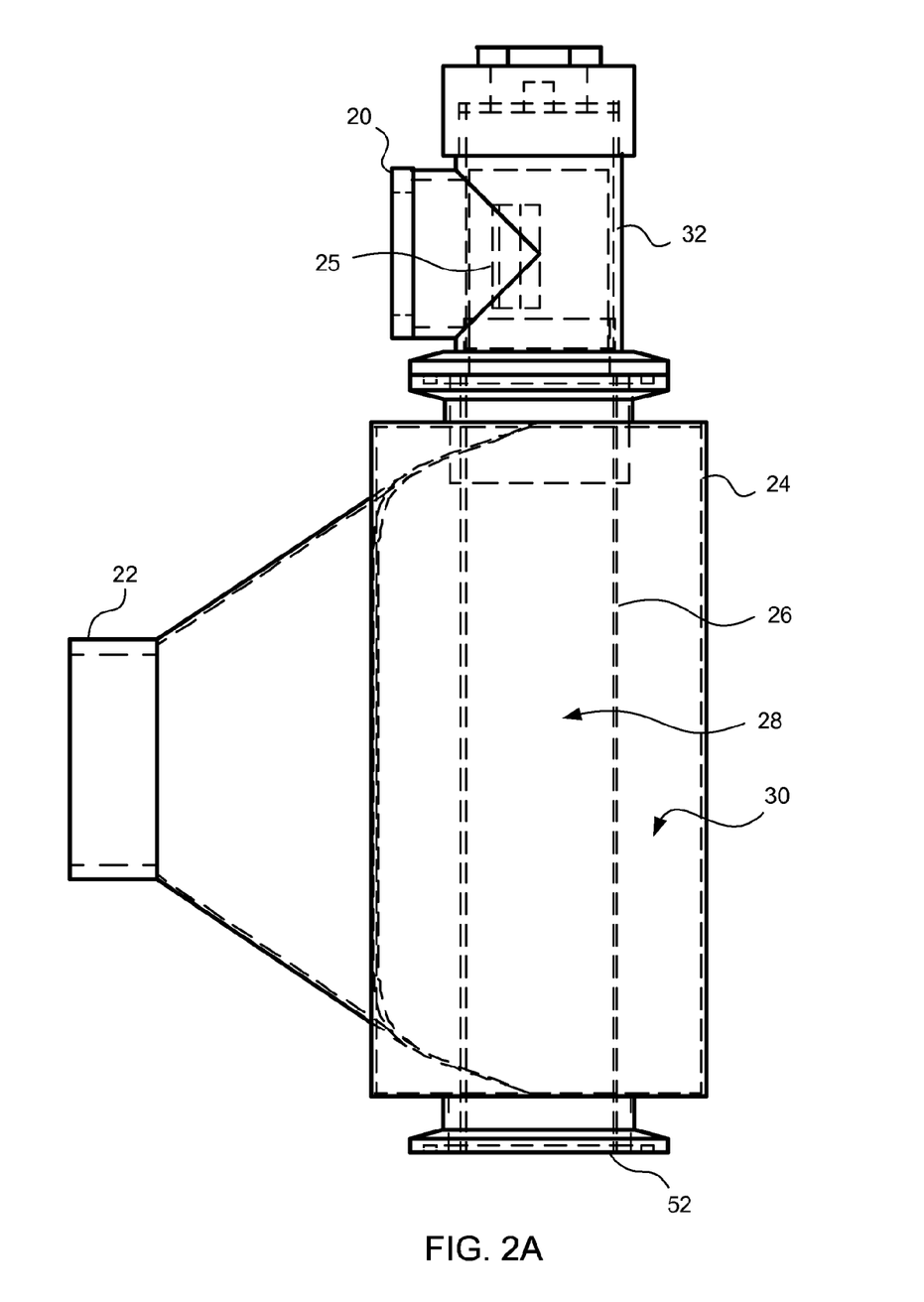
FIG. 2A is a perspective partial see-through view of a reactor having a header portion and a contacting chamber portion in accordance with one embodiment of the present invention.

As shown in FIG. 2A, the SFR includes an inlet for a first fluid 20, and an inlet for a second fluid 22. The contacting chamber 24 includes a fluid contactor screen 26 that extends the length of the contacting chamber, and is concentric with the contacting chamber, thus dividing the volume of the contacting chamber into an inner volume 28 and an outer annular volume 30. The fluids are introduced into the contacting chamber so as to produce a spinning flow in the inner volume and optionally in the outer annular volume as well. Such flow patterns can result from a tangential injection (as illustrated in FIG. 2A), or can be formed through other means such as internal baffles. For example, FIG. 2A also shows a slot 25 within the inlet 20. This slot is offset (towards the front) within inlet opening and constrains flow to enter the upper header portion tangentially along inside walls (counter-clockwise when viewed from the top). As the fluid flows down into the lower contacting chamber 24, the spinning flow is maintained along the fluid contactor screen.

Figure 2B:
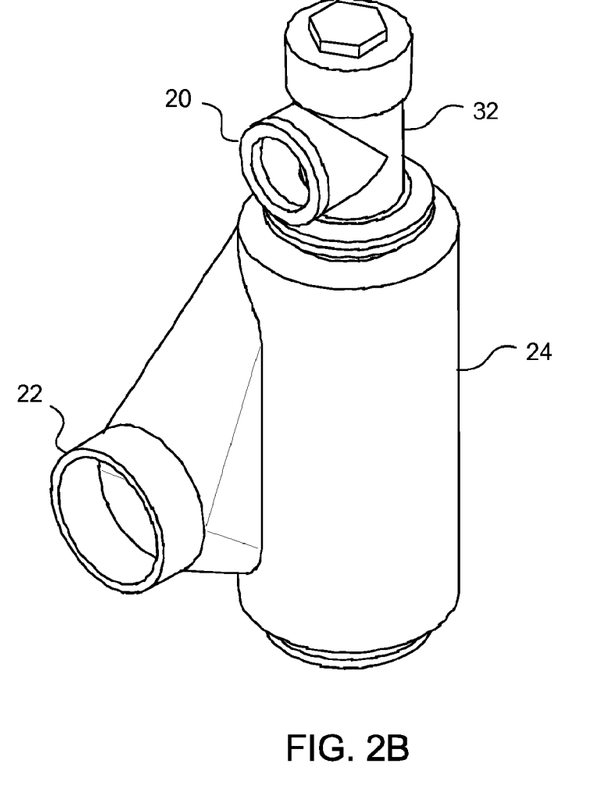
FIG. 2B is an elevated perspective side view of a spinning fluids reactor in accordance with one embodiment of the present invention.
Figure 2C:
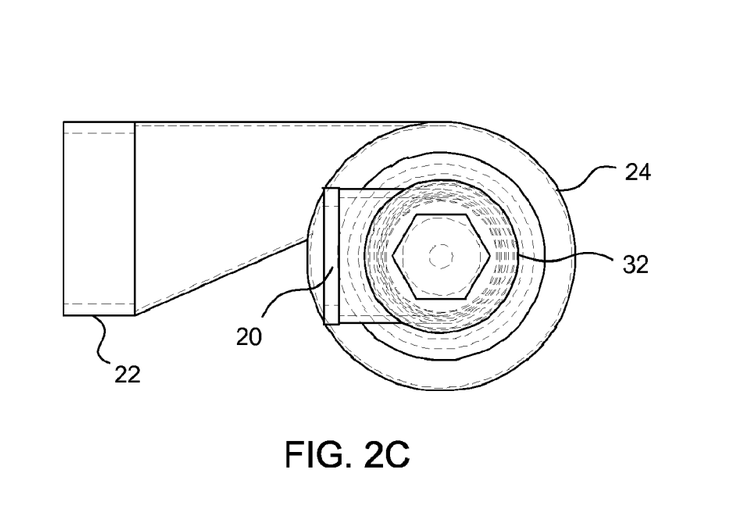
FIG. 2C is a top cross-sectional view of FIG. 2B.

FIG. 2B shows the second fluid inlet 22 in an offset position so as to produce tangential injection of the fluid into the contacting chamber 24 (i.e. clockwise flow when viewed from the top). In this embodiment, the first fluid inlet 20 in the upper header portion 32 and the second fluid inlet are oriented to produce counter-spinning flows (counter-clockwise versus clockwise). The two spinning fluids can be spinning in the same direction through the inner and outer volumes, or can be spinning in counter-current directions. FIG. 2C shows a top view of FIG. 2B which highlights the offset inlet 22.

The contactor screen can be any wall which allows formation of a barrier while also allowing fluids to pass across the wall under certain conditions. Non-limiting examples of contactor screens can include steel mesh screen, perforated sheets, frit sandwiched between screens, woven sheets, supported liquid membranes, and the like. In one aspect, the contactor screen can be a supported liquid membrane having an ionic liquid therein.

Formerly, ASH reactors relied on a pressurized jacket of gas around a vortex flow of liquid in order to reach effective sparging of the gas through the liquid. The SFR design utilizes spinning flow of both fluids, where either fluid can independently be selected from gas or liquid. Such alteration into the method of contacting fluids, and each fluid's momentum affect the reaction kinetics. Such alterations to the reaction kinetics are generally towards reducing reaction time, and thus an SFR reactor can process greater amounts of reactants in a smaller volume, with less time, etc.

A non-limiting example of a specific use of the SFR is in cyanide recovery from gold processing. An advanced and complete investigation for SFR application in the area of environmental separations has been carried out for cyanide recovery from a barren solution originating from gold hydrometallurgical processes. SFR units installed in a mobile system were used as contactors for HCN stripping and re-absorption. The SFR system was operated under a negative pressure for safety reasons. Three rounds of field tests were performed at Newmont Mining Corporation gold cyanidation plant near Midas, Nev., USA. From a safety and processing efficiency standpoint most significant was the performance of an SFR as a scrubber. The gas phase leaving the scrubber was monitored for HCN content using a Dräger monitor. HCN removal efficiency exceeded 95% in one pass through the SFR equipped with stainless steel mesh.

HCN content in the discharged air was dependent on the pH of the alkaline solution in the absorption tank, and the air flow rate, and was maintained below 35 ppm for pH=13 and 2.7 $m^3$/min (90 scfm) flow rate, but could be suppressed further in a more alkaline environment. Using a polyethylene porous tube and comparable absorption parameters, HCN content of the off gas was less than 10 ppm, indicating a somewhat higher absorbing efficiency with the porous tube than with steel mesh. Unlike the porous polyethylene tube, the stainless steel mesh was not as susceptible to plugging. The mesh size in this case was 10 mesh, although other mesh sizes can be suitable such as about 5 mesh to about 32 mesh, depending on the particular fluid properties and respective flow rates. After 65 hours of operation, the stainless steel mesh was scale free. Thus anti-scalant reagent addition was not necessary. The pressure drop in the scrubber was several centimeters of $H_2O$. The required pumping pressure for the alkaline solution was 0.05 MPa (7 psi), which corresponds to (or is less than) the pumping head necessary for absorption in typical packed towers.

The total pressure drop in the entire system already allows for operation in a closed circuit for the gas phase which alleviates concerns about atmospheric air pollution. This system required a bleed air system to maintain a vacuum in the circuit, although in other designs such bleed control may be unnecessary.

As experienced in this example, the pressure drop for the SFR can be relatively low compared to other similar reactors. In one aspect, the SFR can have a head loss of less than about 2 ft. In another embodiment, the SFR can have a head loss of less than about 1.5 ft, or even less than about 1 ft. In another aspect, the head loss in the header can be less than about 14 psi. Utilizing designs having such low head loss, a vacuum blower can replace a compressor in similar reactor designs. The use of a vacuum blower reduces energy requirements, and likewise reduces costs. In one aspect, where a mesh screen is utilized as the fluid contactor screen, a change in mesh size can compensate for a pressure drop. However, the SFR can also function, in one aspect, under high pressure. Alternatively, the SFR can function under vacuum, such as would be desirable to prevent emission of toxic gasses.

Figure 3:
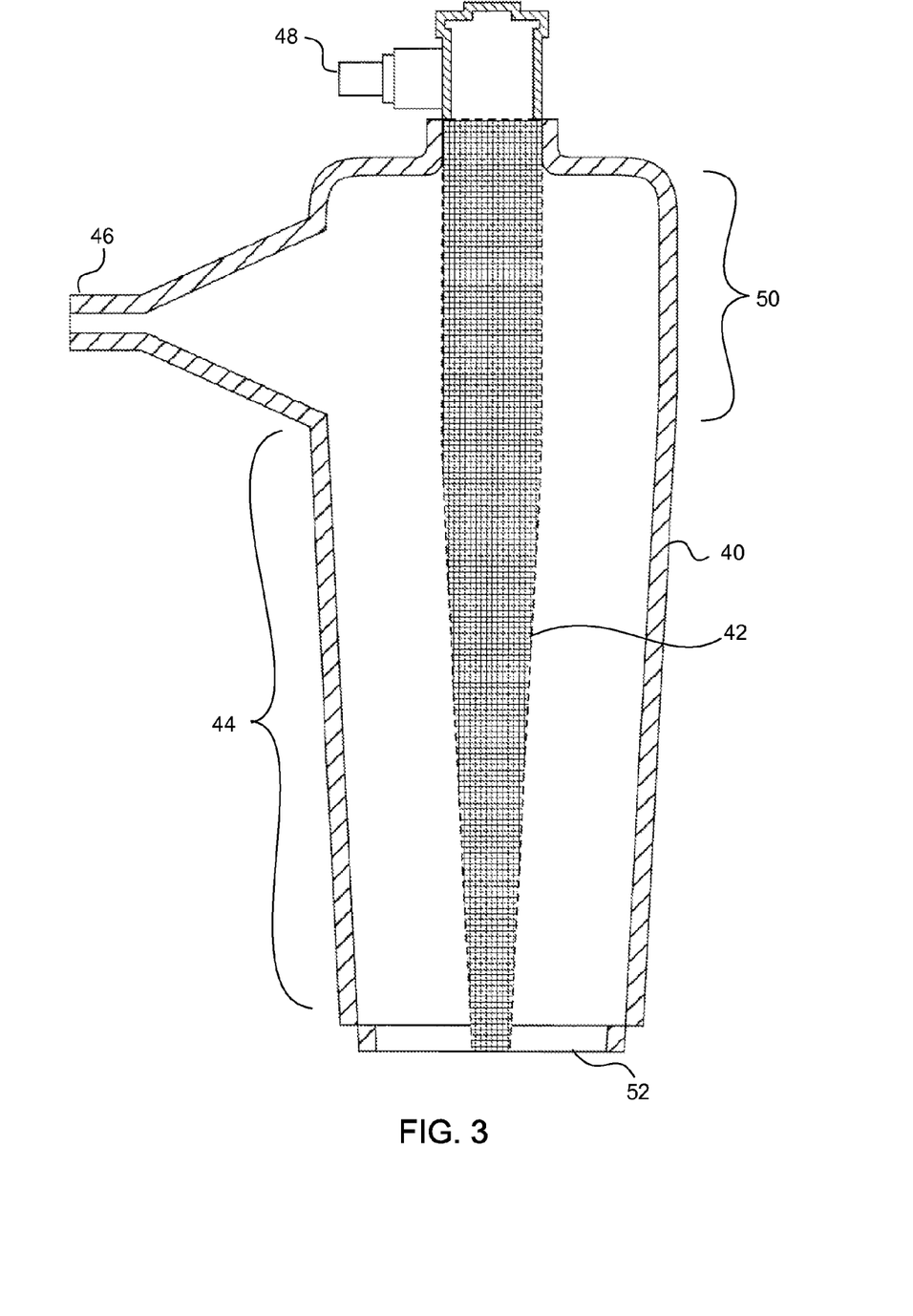
FIG. 3 is a perspective partial cut-away view of a reactor having a header portion and a contacting chamber portion with a conical section in accordance with one embodiment of the present invention.

The velocity of fluids throughout the reactor body can vary greatly and ratios of fluids from each of the first and second inlets can be adjusted for a particular application. In one aspect, the velocity of the first fluid can be about 6 to about 7 m/s. High velocities generally increase efficiency of the SFR, however, at about 12 m/s, the flow of the first fluid, if liquid, can prevent a gas as the second fluid from crossing through the contactor screen. To better maintain spinning flow of the fluids, the walls of the reactor body 40, and optionally the fluid contactor screen 42, can constrict towards the lower portion 44 of the reactor (i.e. in an inverted conical shape having a modest incline) as shown in FIG. 3. Inlets 46 and 48 can have the same arrangements as previously described. In one aspect, the walls can have about 1 to about 3 degree incline for the length of the contacting chamber. In another aspect, the walls can be generally vertical for less than or equal to about half of the length of the contacting chamber, and then can incline, thus reducing the diameter of the contacting chamber. As shown in FIG. 3 the upper portion 50 can have a constant cross-section and the lower portion 44 can include the conical reducing chamber.

Generally, the SFR can include one or more outlets operatively connected to the reactor body and in fluid communication with at least one of the inner or outer volumes. One outlet is generally placed near the bottom of the SFR, wherein the reaction product exits the reactor. FIG. 2A through FIG. 3 show primary outlets 52 from the outer volume at the bottom. Overflow gases can be removed from an optional upper outlet. However, in some embodiments, gaseous and liquid products can be separated subsequent to removal from the spinning fluids reactor such that only a single primary outlet is needed. Depending on the selection of fluids and the pressure with which the SFR is in operation, an outlet can also be placed near the top of the reactor, or on a side of the reactor.

The SFR is cost effective and an elegant solution for many industrial processes employing mixing two or more fluids (both liquids and gasses) in order to carry out chemical reactions, scrubbing, stripping, etc. The SFR can advantageously be mounted to a trailer or pallet for configuration as a mobile installation, e.g. quick and/or temporary installation.

The SFR can substitute or replace various existing equipment, including absorption towers and catalytic burners. The SFR can also be of such a size that industrial space requirements are significantly less than comparable equipment to achieve substantially the same or better results with smaller head losses and lower power consumption. The SFR is also much more cost effective and less expensive than comparable equipment. As such, use of an SFR can result in a significant decrease of capital expenditures. The SFR is compatible with many currently-running processes and can be incorporated into a process during plant modernizations, such as by replacement of an existing absorption column or otherwise oriented along a fluid flow path of the fluid to be treated.

In this regard, significant advantages can be achieved due to rapid mass transfer in the SFR. With the increase of mass transfer speed by, in one aspect, ten or more times, the SFR does not need to be as large as other reactors. The SFR can be scalable by combining reactors in parallel clusters and utilizing multi-stage installations in series. Non-limiting examples of applications of the SFR include use in chemical synthesis, minerals processing, selected refinery processing, air treatment in environmental protection, wastewater treatment, and many other applications.

The SFR can have applications reaching far beyond the applications of the air-sparged hydrocyclone (ASH). To contrast with the ASH, the SFR has two fluids separately spinning within the reactor, whereas the ASH has a vortex of a fluid at least partially encased by a jacket of pressurized gas so as to sparge through a porous separating tube and through the vortex. The SFR can also be maintained at a variety of pressures, including vacuum. In contrast, typical ASH design can tend to plug due to collapse of the inner porous tube under vacuum. The head loss can be substantially lower than comparable ASH processing. The SFR has the capacity to utilize two liquids as the fluids of reaction. Furthermore, the SFR is not bound by the stringent requirements of a generally thick separating tube of the ASH, formed to handle the pressure required for processing. On the contrary, the SFR fluid contactor screen can be as simple, in one embodiment, as a mesh screen. Such differences allow for a greater range of reactants and reaction products, allow for reduced costs in materials and processing, and allow for a greater variety of reactions, beyond sparging-processing. The SFR technology can also be useful for the stripping of volatile organic compounds (VOC) from contaminated water.

The SFR has also shown promise when used in environmental applications. Given the small bubble size, large bubble flux and the kinetic paths of the bubbles through the swirl layer, gas transfer rates can be very high. Consequently, the SFR can be used to remove volatile organic species from contaminated water and to absorb impurities from effluent gases. Studies indicate that a high concentration of air bubbles with a directed motion within the SFR unit can be effectively applied for the removal of $SO_2$, $CO_2$, HCN and vapors of organic solvents from various industrial gas streams by absorption. Unlike the Couette-Taylor flow reactors (helicoidal flow reactors), the SFR units have no moving parts.

Early investigations revealed that inlet water velocity was an important operational parameter permitting control of the flotation efficiency and the bubble-size. Later research indicated that the water flow rate and surfactant concentration had a greater impact on the bubble-size distribution than the pore size of the porous tube. The mean radius of the bubbles, exiting the bottom discharge, was as small as 50 to 150 μm. The minimum bubble radius recorded was 10 μm, which represented the detection limit of the analytical procedure.

In one aspect, wire mesh can be utilized as the fluid contactor screen in the SFR. The wire mesh tube or sparger can be fabricated, from a great variety of materials, which widens the field of application beyond the conventional ASH into many chemical reactor designs. Wire screens can easily be formed, welded, coated and designed for enhanced heat exchange. Depending on strength, abrasion resistance, chemical resistance, corrosion resistance and heat transfer characteristics of the wire mesh, the SFR can be used as a contactor or a chemical reactor in the oil industry, in the food and pharmaceutical industries, and of for environmental applications. The use of a wire screen additionally enables relatively easy replacement, when needed. The openings in either case could be as large as 1 or 2 mm since bubbles are sheared by the turbulent flow of the liquid phase. The trajectories of particles and the momenta of fluids being contacted in the reactor unit also have to be considered.

The use of a wire screen results in a dramatic drop of resistance to the flow of the gas phase when compared to the conventional ASH (from $1 \times 10^{-1}$ MPa/15 psi to $5 \times 10^{-4}$ MPa/0.07 psi) thus a significant savings in energy. A tangential air inlet, used to effectuate, in one aspect, the swirl flow of the air, further reduces the pressure drop and provides uniform flow of gas through the mesh. Additionally, multi-stage and parallel arrangements of the SFR units can be used for process scale-up. Operation under a vacuum in a closed system with recycle of the gas phase has been successfully completed. Such a mode of operation is vital with poisonous gas stripping/absorption, such as HCN. Low resistance in the path of the gas phase allows for large volumetric ratios of gas to liquid ($Q^* > 100$), particularly important for solutes having low Henry's law constants.

APPLICATIONS

Figure 4:
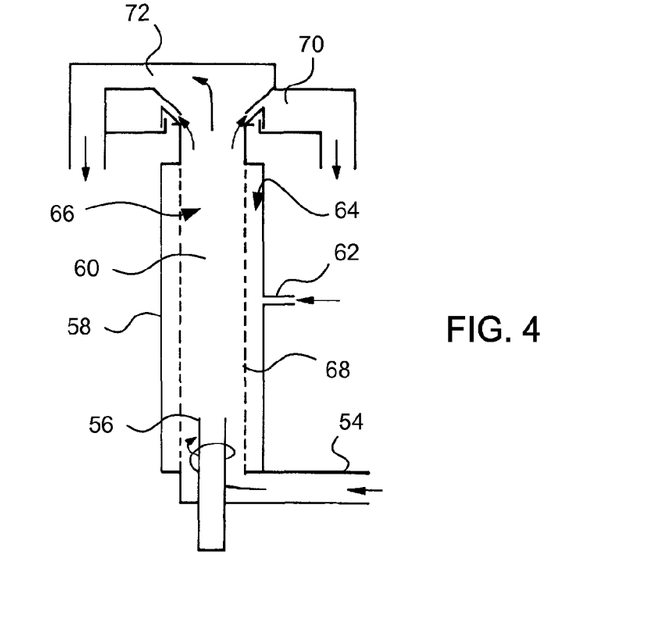
FIG. 4 is a side cross-sectional view of a reactor having overflow and inlets for oil flotation from water in accordance with one embodiment of the present invention.

The SFR can be used for deoiling or separation of aqueous and oil phases. A schematic drawing of an SFR system in which the oil-water separation can be accomplished is shown in FIG. 4. The air can be introduced through a stainless-steel porous cylinder with a suitable average pore size e.g. 1 micrometer. Due to the resulting shear forces acting on the surface of the porous wall, the air-bubble size can be reduced to between 0.2 mm to 0.5 mm in the absence of surfactants. The hydrocyclone can be equipped with an adjustable gap to control the distribution of water to the underflow and overflow. The design shown in FIG. 4 allows for the separation of oil and water without addition of a frother. In this case, the oil is fed tangentially via an inlet 54 oriented near the bottom of the reactor body 56. A tubular riser 58 can be placed axially in the reactor body around which the oil initially flows. The tubular riser can have a height sufficient to allow establishment of a swirl flow within an open region 60 of the reactor body. A second inlet 62 can be used to create the outer volume flow 64 where the inner flow 66 and outer flow are separated by a contactor screen 68. Flooding of the air-sparged hydrocyclone can be avoided, and the formation of a water layer at the porous cylinder wall can be achieved. Later research proved that destabilization of the oil-water emulsion using surfactants and polyelectrolyte prior to feeding can result in improved performance. The upper region can include water flow outlets 70 (annularly oriented about the upper header portion) and a gas/froth outlet 72.

Major research has been accomplished in printing ink removal from cellulose pulp during wastepaper processing. The SFR devices of the present invention can also be used in such applications where printing ink and other hydrophobic impurities are removed from process water circulating in a closed system during processing of wastepaper in large pulp and paper works. The separation process can be used to "whiten" the aqueous stream prior to recycle with simultaneous minimization of water volume directed to the overflow.

SFR can also be used in wastewater treatment. For example, the SFR system can have an eliminated underflow restriction. The outlet fluids from such treatment can include a froth together with the cleaned water. This mixture can be introduced into a receiving tank where the froth and bubble-particle aggregates accumulate at the surface and water is drained out of the froth, resulting in a high solids concentration (12-25%) in the froth. It is expected that coagulation, flocculation and attachment of bubbles to microscopic particles occurs inside the SFR reactor body and all bubble-particle aggregates are formed before introduction into the separation tank. This SFR system can operate under challenging environments such as high conductivity, pH or stable emulsions and complex surfactants, where traditional flotation techniques are ineffective, e.g. treatment of food processing wastewater and removal of petrochemical oils as well as vegetable and animal products which are naturally emulsified or solubilized.

Figure 5:
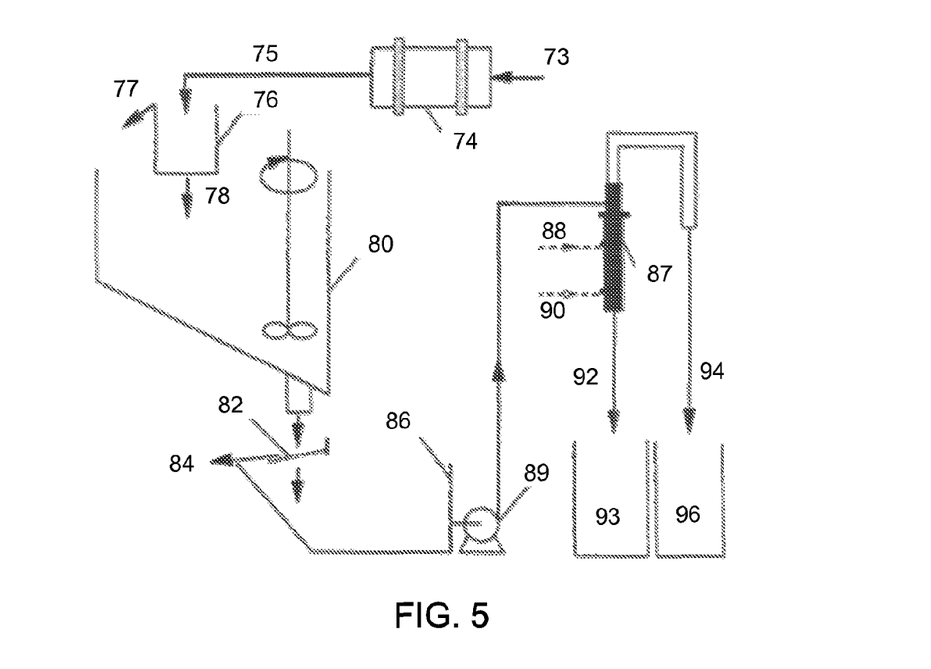
FIG. 5 is a schematic flow diagram for separation of bitumen from tar sands in accordance with one embodiment of the present invention.

Another application of the SFR system is for separation of oil-water-solids. Effective recovery of bitumen from Utah oil sands includes complete oil displacement from the mineral surfaces in order to obtain a clean sand product in the underflow and an oil-rich froth in the overflow. FIG. 5 shows a schematic of one embodiment for recovery of bitumen. In this embodiment, the tar sand is mixed with water and other additives (e.g. caustic, suppressant for $Ca^{2+}$, e.g. sodium tripolyphosphate, hydrocarbon diluents, etc.) to form a slurry 73 and sent to a digester 74. The digester can be a rotating drum or other suitable mixing vessel. The digested slurry 75 (or at least partially digested slurry) can be sent to a settling tank 76 where bitumen concentrate 77 can be removed and remaining slurry 78 can be sent to a conditioning tank 80 which can be optionally mixed using a mixer. Flow from the conditioning tank can be filtered at a filter 82 such that undigested aggregates 84 can be removed and remaining slurry sent to a preparation tank 86. This fluid contains partially digested slurry, including bitumen, sand and water. This slurry can be fed to the SFR 87 first inlet 88 (upper inlet) using a pump 89 to form the inner flow while air can be injected into the second inlet 90 to form the outer swirl flow. Undigested oil-sand aggregates can report to the underflow 92 which can be collected in underflow tank 93, since the buoyancy force of the gas bubble is not able to overcome the pronounced centrifugal force developed. However, bitumen-sand agglomerates (which contain more oil phase at the surface than undigested particles) and free bitumen droplets can report to the overflow 94 which is collected in an overflow tank 96.

Separation results can become unpredictable if oil firmly adheres to sand particles, such as in the insufficiently digested oil sand slurry. Processing conditions can be established to separate oil from the finer part of the sand fraction (0.038 to 0.6 mm) using one step flocculation of dispersed oil and fine sand. The centrifugal force field of the SFR can cause the flocculated phases to split. Thus, flocculated oil can report to the froth phase and the flocculated sand to the underflow providing high oil recovery to the overflow. Soil cleaning can be more effective for sand exposed to oil for less than 24 hours, and very difficult for sand which remained in contact with oil for more than 3 months. Oil displacement during conditioning of sand slurry can be increased when the temperature of the process is raised. An increase in the surfactant concentration can also increase oil displacement.

A similar application includes the flotation separation of fine, unburned coke grains from coal-fueled power plant fly ash.

The SFR systems can also be used for stripping of volatile organic compounds from water such as, but not limited to, removal of MTBE and methanol from contaminated water.

Gas and vapor absorption can also be readily accomplished using the SFR systems of the present invention. The large flow of flue gas resulting from the combustion of fossil fuels significantly influences the cost-effectiveness of the absorption method. An increase of sulfur dioxide concentration, for constant air flow rates, results in the degree of absorption increasing since the absorption rate is in proportion to the concentration of the reacting substance.

Another application is treatment of voluminous gas streams from ventilation systems of industrial facilities, discharging organic contaminants. Absorption of vapors (e.g. of hydrocarbon solvents) in hydrophobic liquids can help to avoid atmospheric pollution. For example, toluene removal from ventilation air in pharmaceutical manufacturing can be accomplished.

A major environmental concern in the utilization of coal for electric power generation is the release of $SO_2$ and $NO_X$. Another component of the combustion gases, namely $CO_2$, is also of concern. Absorption in packed towers is most commonly considered here to minimize the environmental impact of gas emissions. Absorption of all three gases is of particular interest when it can be carried out in a single step with a very short residence time. The large flow of flue gas resulting from the combustion of fossil fuels significantly affects the cost-effectiveness of the absorption method. Thus, the SFR systems can provide such benefits.

In most applications, the sparging gas cleans and protects the porous tube from scaling and fouling. Because of the very small bubble size, large bubble flux, the trajectory paths of the bubbles through the swirl layer and turbulent shear flow, gas transfer rates are very high. Consequently the SFR can be used not only for rapid absorption of gaseous impurities such a $SO_2$, but also to remove volatile organic species from water or to effectively aerate water.

Theoretical Basis for Sulfur Dioxide Absorption

Sulfur dioxide absorption in water is determined by hydrolysis and physical absorption. For very high partial pressures of $SO_2$ or when the absorbing solution has a pH<1, physical absorption prevails. The absorption rate in this case is determined by the following rate equation:

$$N_{SO_2,physical} = \frac{1}{\frac{1}{k_G A} + \frac{H}{k_L A}} \Delta p_{SO_2} \quad (1)$$

where: $N_{SO_2,physical}$ is the rate of physical absorption, A is the mass transfer area, $k_G$ is the gas-side mass-transfer coefficient, $k_L$ is the liquid-side mass-transfer coefficient, H is the Henry's constant, $\Delta p_{SO_2}$ is the absorption driving force, determined by the following equation:

$$\Delta p_{SO_2} = p_{SO_2,avg} - H \cdot c_{SO_2} \quad (2)$$

where: $c_{SO_2}$ is the concentration of sulfur dioxide in liquid phase, $p_{SO_2,avg}$ is the quantity describing the relationship between partial pressure of sulfur dioxide going into the absorber $p_{SO_2,in}$ and going out $p_{SO_2,out}$:

$$p_{SO_2,avg} = \frac{p_{SO_2,in} - p_{SO_2,out}}{\ln \frac{p_{SO_2,in}}{p_{SO_2,out}}} \quad (3)$$

Considering the hydrolysis reaction, the total absorption rate $N_{SO_2,total}$ will be the following:

$$N_{SO_2,total} = E \cdot N_{SO_2,physical} \quad (4)$$

where: E is the acceleration coefficient, which is the ratio of the total absorption rate to the physical absorption rate.

The acceleration coefficient E can be calculated from the following equation:

$$E = 1 + \sqrt{\frac{D_{HSO_3^-}}{D_{SO_2}}} \cdot \frac{\sqrt{K_c}}{\sqrt{c_{SO_2}^*} + \sqrt{c_{SO_2}}} \quad (5)$$

where: $D_{HSO_3^-}$ is the bisulfite ion diffusion coefficient, $D_{SO_2}$ is the sulfur dioxide diffusion coefficient, $K_c$ is the effective equilibrium constant for the sulfur dioxide hydrolysis reaction in concentration units, $c_{SO_2}^*$ is the equilibrium concentration of sulfur dioxide in liquid phase.

During the absorption of sulfur dioxide in water the following reactions may occur:

$$SO_2 + H_2O = H_2SO_3 \quad (6)$$

$$H_2SO_3 = HSO_3^- + H^+ \quad (7)$$

The total concentration of sulfur dioxide $c_{SO_2}^*$ in the liquid phase is equal to:

$$c_{SO_2}^* = [SO_2] + [H_2SO_3] + [HSO_3^-] \quad (8)$$

Substitution of $SO_2$ concentration in equation (8) by Henry's constant, and the concentration of $H_2SO_3$ and $HSO_3^-$ by the equilibrium constants for reactions (6) and (7) gives the following relationship:

$$c_{SO_2}^* = \frac{p_{SO_2}}{H} + \frac{K_1 p_{SO_2}}{[H_2O]H} + \sqrt{[H_2O]K_1 K_2 \frac{p_{SO_2}}{H}} \quad (9)$$

where: $K_1$—equilibrium constant for reaction (6), $K_2$—equilibrium constant for reaction (7). The above relationship between $c_{SO_2}^*$ and $p_{SO_2}$ is not linear.

During the absorption of sulfur dioxide in an alkaline solution the following reactions take place:

$$SO_2 + OH^- = HSO_3^-, K_3 = 1.7 \cdot 10^{12} \text{ dm}^3/\text{mol} \quad (10)$$

$$HSO_3^- + OH^- = SO_3^{2-} + H_2O, K_4 = 3.5 \cdot 10^8 \quad (11)$$

Equilibrium constants for the above reactions are given for the temperature of 25° C. The hydrolysis and dissociation rates are very fast in dilute alkaline solution. In the presence of excess $OH^-$ both reactions are practically irreversible and instantaneous.

The overall reaction in alkaline solution is as follows:

$$SO_2 + 2OH^- = SO_3^{2-} + H_2O \quad (12)$$

For a system in which the sulfur dioxide absorbent is a sodium hydroxide solution, the main diffusion resistance is on the gas phase side, the resistance on the side of the liquid phase can be omitted as discussed previously.

Assuming that:

$$\frac{1}{k_G A} \gg \frac{H}{k_L A} \quad (13)$$

the equation describing the absorption rate of sulfur dioxide in a solution of sodium hydroxide takes on the following form:

$$N_{SO_2,total} = k_G A \cdot \Delta p_{SO_2} \quad (14)$$

A coalescing cartridge can be placed in the preparation tank to prevent carry over of absorbent mist. The cartridge can be filled with hydrophilic fibrous packing appropriate for the acidic environment. The increase of the driving force of the absorption process the value of the mass transfer coefficient is not expected to change with $SO_2$ partial pressure. The absorption rate is also in direct proportion to the driving force, in accordance with the equation (1). It is also expected that the volumetric water flow rate bears a slight influence on the extent of sulfur dioxide removal as is the case for oxygenation of water. A non-linear relationship indicates that a change in water flow rate results in an increase in the mass transfer coefficient values. With an increase in the amount of water delivered to the cyclone absorber, the turbulence of the liquid flow is increased. Also, it causes the shearing forces along the porous tube surface to increase and smaller gas bubbles are generated. In this regard, mass penetration resistance decreases on the side of the liquid as well as on the side of the gas. With an increase in air flow rate, the absorption rate increases proportionally. Both water flow rate and air flow rate influence the rate of absorption. The non-linear relationship between the absorption rate and the air flow rate can be accounted for by a decrease in the resistance to mass transfer (increase of mass penetration coefficients) due to an increase in the turbulence of the flow for both the gas and liquid phases. It is expected that only a small increase in efficiency of sulfur dioxide removal from air takes place for longer porous sections. As in the case of oxygenating water, the influence of the length of the porous section is connected with a change in the conditions of multiphase flow and generation of gas bubbles.

The solubility of sulfur in water is sufficient to design a regenerable process based on waster as absorbent. The SFR system can be used as a gas-liquid contactor such as where dimethylaniline solution, aqueous solution of sodium sulfite, citrates, and limestone slurry are used as absorbents.

In another application, the high specific capacity of SFR technology can provide exceptional capability for the removal and/or destruction of chemical and biological weapons (CBW) agents from a high volume air flow in a short time, while not obstructing the air flow in the existing heating, ventilating, and air-conditioning (HVAC) systems during normal operating conditions. In some aspects, the SFR-based system can occupy ten percent of the space required for more traditional systems. The SFR technology is exemplified by rapid and exceptionally efficient absorption of HCN from HCN-laden air which recently has been demonstrated for use in gold cyanidation plants (e.g. continuous stripping and recovery of cyanide from the AVR process from process water at a gold plant site), toluene removal, and for $SO_2$ and organic solvents removal from air.

Recent terrorism events have increased interest in the vulnerability of workplaces, schools, and other occupied buildings to chemical, biological and radiological (CBR) threats. Of particular concern are the airflow patterns and dynamics in buildings, specifically in the building heating, ventilating, and air-conditioning (HVAC) systems.

These systems can become an entry point and a distribution system for hazardous contaminants, particularly CBR agents. It is not possible to completely eliminate the risk of a terrorist attack, however, it is possible to reduce the risk of a successful attack and to minimize the consequences of such an attack to both the building and its occupants. A reliable technology is needed to decrease the likelihood or effects of a CBR incident and respond quickly and appropriately should a CBR incident occur.

The SFR technology can provide exceptional capability for the removal and/or destruction of airborne CBW agents from high volume air flow in a short time, while not obstructing the air flow in the existing HVAC systems during normal operating conditions. For integration into HVAC systems, a low pressure drop in the gas path is necessary. In this case the SFR units can be fluidly connected downstream of air intakes and either before or after the primary fan. An optional induction fan can also be included, if needed to sustain desired air flow rates throughout the HVAC system.

Further, treatment of voluminous gas streams can involve multiple SFR units operated in parallel with additional units in series if needed to bring ppm to acceptable levels. The multi units can be assembled into an extremely compact but efficient scrubbing tower. The scrubbing tower can be installed within the existing ventilation or air conditioning systems, presenting only a few inches of water resistance to the gas flow, when not in use, and only a few more when operating. Highly efficient decontamination of buildings can be expected based on initial experiments such as HCN removal of over 99% performance, e.g. HCN content in air was reduced from 1500 ppm to less than 20 ppm in one stage, in one second. The cleaning potential can be expanded with regard to larger pollutant initial concentration or to the scrubbing effect by adding more stages in series. Further, HCN content in the discharged air is also dependent on the pH of the alkaline solution in the absorption tank, and the air flow rate. In one aspect, the HCN concentration can be readily maintained below 35 ppm (for pH=13 and 2.5 $m^3$/min flow rate), but can be suppressed further in a more alkaline environment.

Impact of the length of the reactor body in an SFR on the extent of absorption for different $SO_2$ concentrations is meaningful. For example, an increase in length from 16 to 32 cm results in an increase in the extent of absorption from 96.5% to 98%. Further, lengthening of the section to 47 cm results in a less pronounced increase. As in the case of oxygenating water, the influence of the length of the porous section is connected with a change in the conditions of multiphase flow and generation of gas bubbles.

Photochemical Degradation

In the last decade advanced oxidation processes have been gaining importance for destruction of waste as a cleaner method enabling conversion of organic contaminants to harmless species. Photodegradation processes in the presence of hydrogen peroxide ($H_2O_2$), ozone ($O_3$) and titanium dioxide ($TiO_2$) are most frequently offered for wastewater treatment. The SFR of the present invention can be additionally equipped with an UV lamp. For example, a UV light source can be oriented within the reactor body. Any location which allows for exposure of either or both of the inner and outer volumes can be suitable. In one aspect, the UV light source can be an elongated light source axially oriented down the center of the reactor body (e.g. a medium pressure mercury lamp or optical fibers). In another aspect, a solar collector can be connected to the optical fibers and used to collect sunlight. In another aspect, the separator screen can be formed of a fiberglass (or other light conducting material) and coupled to optical fibers.

In yet another aspect, the spacing of the fluid contactor screen and the outer reactor wall can be substantial. As a general guideline, a ratio of the distance between the outer wall and the screen, and the screen to the center axis can be from about 0.5:1 to about 8:1. Optional spraying nozzles can also be oriented within the cyclone casing and directed toward the separator screen. These nozzles can be used for high pressure rinsing of the screen to remove fouling or other undesired debris buildup on the screen.

The SFR offers improvements over the ASH reactor in low pressure drop (5-7 cm $H_2O$; 0.1 psi). The SFR design allows for larger gas flow rate (easy adjustment of Q*), allows for ease in replacement of the fluid contactor screen, reduced energy demand, and closed system operation thus avoiding atmospheric pollution. The SFR absorbing/stripping system is relatively small and readily transportable, particularly in comparison with the conventional technology that requires the use of large packed towers and the resultant large concrete foundations and footprint. An SFR system can be fabricated and assembled completely off-site, then transported and made operational in a short time period with a small, temporary footprint, which is preferable to several large concrete and steel structures. A transportable SFR mobile system can be moved from one site at the end of operations to another site at little cost. These results and the results from other research programs demonstrate the utility of the SFR for environmental applications.

In the SFR, the gas phase can be introduced tangentially to the gas chamber resulting in a spinning motion, which allows for advantageous pressure distribution in the chamber. The liquid is tangentially fed to the reactor and continues a spiral flow on the inside surface of the dispersing tube (for example the cylindrical screen), gradually losing its momentum. The openings in the dispersing tube (cylindrical screen) can remain in the 2 to 0.02 mm range. The flow revolution distance of the spinning liquid can increase for a cylindrically shaped mesh insert but can be adjusted when a conical mesh geometry is used.

The gas phase can spin co-currently or counter-currently with respect to the liquid swirl as previously mentioned. Advantageously, the volumetric flow ratio of the gas flow over the flow of the liquid can typically remain below 12 (Q*<12).

The possibility of application of a mesh screen as a dispersing element in SFR is predetermined by the pressure field equilibrium obtained at the mesh between the liquid and the gas phases. In this regard, fluid dynamics conditions in the reactor can be operated such that equilibrium is maintained along the entire dispersing element. This aim can be obtained by providing a conical rather than cylindrical dispersing element.

Three parameters, namely: the liquid phase flow rate, the gas phase flow rate and the cone solid angle of the mesh, were considered in optimization of the SFR performance. The cone solid angle can be adjusted along the dispersing element, if required.

Although operating parameters can vary for particular configurations and designs, in one aspect, a 2" cyclone header liquid inlet velocity can be in the range of 5 to 12 m/s—referring to the cross-section of the inlet slot. For such a liquid feed rate the corresponding amount of gas rate varies from 0.8 to 1.5 m$^3$/h. Similarly, the length of the cylindrically-shaped dispersing element can remain within a factor of 2 to 5 times $D_0$ (where $D_0$ is the diameter of the mesh insert). In the case of conically-shaped mesh insert, the dispersing element length can be extended to 8 times $D_0$ (where $D_0$ is the greatest diameter of the intersected cone mesh). The cyclone header can optionally contain several inlet slots arranged regularly around the circumference, or placed on ⅓ of the circumference; however, the total cross section area of all slots generally does not exceed the cross section area of a single inlet slot. Such multiple inlet slots can aid in forming a substantially uniform spinning fluid flow.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, and manner of operation, assembly, and use may be made without departing from the principles and concepts set forth herein.

What is claimed is:

1. A spinning fluids reactor, comprising:
   a) an elongate reactor body having a circular cross-section;
   b) a fluid contactor screen within the reactor body, said fluid contactor screen having a plurality of apertures and a circular cross-section concentric with the reactor body for a length thus forming an inner volume bound by the fluid contactor screen and an outer volume bound by the reactor body and the fluid contactor screen;
   c) a primary inlet operatively connected to the reactor body and configured to produce a first spinning flow of a first fluid within the inner volume which is a flow-through flow;
   d) a secondary inlet operatively connected to the reactor body and configured to produce a second flow of a second fluid within the outer volume; and
   e) an outlet operatively connected to the reactor body and in fluid communication with the inner and the outer volumes.

2. A reactor as in claim 1, wherein a ratio of the inner volume to the outer volume is about 1:1 to about 1:5.

3. A reactor as in claim 1, wherein openings in the fluid contactor screen are about 0.02 mm to about 2 mm.

4. A reactor as in claim 1, wherein the fluid contactor screen is a wire mesh screen.

5. A reactor as in claim 1, wherein the fluid contactor screen is a perforated sheet.

6. A reactor as in claim 1, wherein the first spinning flow and the second flow are substantially concentric.

7. A reactor as in claim 1, wherein the secondary inlet is configured to produce tangential injection such that the second flow is a spinning flow.

8. A reactor as in claim 1, wherein the elongate reactor body comprises a conical shape portion having a decreasing diameter from an upper end to a lower end of the elongate reactor body.

9. A reactor as in claim 8, wherein the conical shape portion has an incline angle from about 1° to about 3°.

10. A reactor as in claim 8, wherein the elongate reactor body further comprises an upper cylindrical portion and wherein the upper end of the conical shape portion is oriented adjacent the upper cylindrical portion.

11. A reactor as in claim 1, wherein the elongate reactor body comprises a cylindrical shape having a substantially uniform diameter.

12. A reactor as in claim 1, wherein the elongate reactor body includes a conical shaped section and a cylindrical shaped section.

13. A reactor as in claim 1, wherein the fluid contactor screen is conically shaped and has a length that is from about 2 to about 8 times a diameter of the fluid contactor screen.

14. A reactor as in claim 1, wherein the fluid contactor screen is cylindrically shaped and has a length that is from about 2 to about 5 times a diameter of the fluid contactor screen.

15. A reactor as in claim 1, further comprising a UV light source oriented to direct UV light into at least a portion of at least one of the inner volume and the outer volume.

16. A method of reacting compounds, comprising:
   a) forming a continuous first spinning flow with a first fluid having a first momentum; and
   b) forming a second flow with a second fluid circumscribing the first spinning flow, said second flow having a second momentum, wherein a ratio of the first momentum to the second momentum is about 0.7 to about 1.3, wherein a cylindrical barrier between the first spinning flow and the second flow permits contact through the barrier of the second fluid to the first fluid sufficient to form a reaction product.

17. A method as in claim 16, wherein the first spinning flow is an annular flow along an internal surface of the barrier.

18. A method as in claim 16, wherein the annular flow has an average thickness from about 10% to about 30% of a diameter of the cylindrical barrier.

19. A method as in claim 16, wherein a volumetric flow rate of the second fluid over the volumetric flow rate of the first fluid is less than about 12.

20. A method as in claim 16, wherein a ratio of an inner volume of the first spinning flow to an outer volume of the second flow is about 1:1 to about 1:5.

21. A method as in claim 16, wherein the first spinning flow and the second flow are directionally coincident.

* * * * *